US008850428B2

(12) United States Patent
Dotan (10) Patent No.: US 8,850,428 B2
(45) Date of Patent: Sep. 30, 2014

(54) USER TRANSPARENT VIRTUALIZATION METHOD FOR PROTECTING COMPUTER PROGRAMS AND DATA FROM HOSTILE CODE

(75) Inventor: Eyal Dotan, Bussy St. Georges (FR)

(73) Assignee: Trustware International Limited, Road Town, Tortola (VG)

( * ) Notice: Subject to any disclaimer, the term of this patent is extended or adjusted under 35 U.S.C. 154(b) by 780 days.

(21) Appl. No.: 12/943,899

(22) Filed: Nov. 10, 2010

(65) Prior Publication Data

US 2011/0113427 A1    May 12, 2011

Related U.S. Application Data (60) Provisional application No. 61/260,784, filed on Nov. 12, 2009.

(51) Int. Cl.
| | | |
|---|---|---|
| G06F 9/455 | (2006.01) | |
| G06F 11/30 | (2006.01) | |
| G06F 17/30 | (2006.01) | |
| G06F 7/04 | (2006.01) | |
| G06F 13/00 | (2006.01) | |
| G06F 21/53 | (2013.01) | |

(52) U.S. Cl.
CPC ............... *G06F 9/455* (2013.01); *G06F 21/53* (2013.01)
USPC .................... 718/1; 713/188; 713/189; 726/2; 726/27; 711/114

(58) Field of Classification Search
None
See application file for complete search history.

(56) References Cited

U.S. PATENT DOCUMENTS

| | | | |
|---|---|---|---|
| 4,962,533 A | 10/1990 | Krueger | |
| 5,280,614 A | 1/1994 | Munroe | |
| 5,349,655 A | 9/1994 | Mann | |
| 5,361,359 A | 11/1994 | Tajalli | |
| 5,398,196 A | 3/1995 | Chambers | |
| 5,408,642 A | 4/1995 | Mann | |

(Continued)

FOREIGN PATENT DOCUMENTS

| | | |
|---|---|---|
| AU | 199955971 A1 | 5/2000 |
| EP | 0472487 A2 | 2/1992 |

(Continued)

OTHER PUBLICATIONS

Goldberg, I. et al. "A Secure Environment for Untrusted Helper Applications," Internet Citation, Jul. 22, 1996, www.cs.berkeley.edu/daw/papers/janus-usenix96.ps.

(Continued)

*Primary Examiner* — Meng An
*Assistant Examiner* — Bing Zhao
(74) *Attorney, Agent, or Firm* — Nixon Peabody LLP; Joseph Bach, Esq.

(57) ABSTRACT

A secure computing environment that prevents malicious code from "illegitimately" interacting with programs and data residing on the computing platform. While the various embodiments restrict certain programs to operate in a virtualized environment, such operation is transparent to the user from the operational point of view. Moreover, any program operating in the virtualized environment is made to believe that it has full access to all of the computing resources. To prevent a user from unknowingly or inadvertently allowing the program to adversely affect the computer, the user is also presented with "feel" that the program is able to perform all operations in the computing environment.

19 Claims, 2 Drawing Sheets

(56) References Cited

U.S. PATENT DOCUMENTS

| | | |
|---|---|---|
| 5,421,006 A | 5/1995 | Jablon |
| 5,446,903 A | 8/1995 | Abraham et al. |
| 5,446,904 A | 8/1995 | Belt et al. |
| 5,613,002 A | 3/1997 | Kephart |
| 5,859,966 A | 1/1999 | Hayman et al. |
| 5,937,159 A | 8/1999 | Meyers |
| 5,958,050 A | 9/1999 | Griffin |
| 6,073,239 A | 6/2000 | Dotan |
| 6,125,447 A | 9/2000 | Gong |
| 6,173,404 B1 | 1/2001 | Colburn et al. |
| 6,189,103 B1 | 2/2001 | Nevarez et al. |
| 6,199,181 B1 | 3/2001 | Rechef et al. |
| 6,275,938 B1 | 8/2001 | Bond et al. |
| 6,314,409 B2 | 11/2001 | Schneck et al. |
| 6,330,670 B1 | 12/2001 | England et al. |
| 6,453,334 B1 * | 9/2002 | Vinson et al. ............ 709/203 |
| 6,549,521 B1 | 4/2003 | Edwards et al. |
| 6,772,332 B1 | 8/2004 | Boebert et al. |
| 6,839,850 B1 | 1/2005 | Campbell et al. |
| 6,871,277 B1 | 3/2005 | Keronen |
| 7,028,305 B2 | 4/2006 | Schaefer |
| 7,188,367 B1 | 3/2007 | Edwards et al. |
| 7,363,493 B2 | 4/2008 | Dotan |
| 7,613,930 B2 * | 11/2009 | Dotan ...................... 713/188 |
| 7,694,328 B2 * | 4/2010 | Joshi et al. ................. 726/2 |
| 7,739,738 B1 * | 6/2010 | Sobel et al. ............... 726/24 |
| 2003/0159070 A1 | 8/2003 | Mayer et al. |
| 2003/0233490 A1 | 12/2003 | Blaser et al. |
| 2005/0120242 A1 * | 6/2005 | Mayer et al. ............ 713/201 |
| 2005/0149726 A1 | 7/2005 | Joshi et al. |
| 2005/0257265 A1 | 11/2005 | Cook et al. |
| 2009/0006744 A1 * | 1/2009 | Cavallo et al. ............ 711/114 |

FOREIGN PATENT DOCUMENTS

| | | |
|---|---|---|
| EP | 0768594 A1 | 4/1997 |
| GB | 2391650 A | 2/2004 |
| GB | 2411748 A | 9/2005 |
| GB | 2411988 A | 9/2005 |
| WO | WO 01/92981 A2 | 12/2001 |
| WO | WO 2005/043360 A1 | 5/2005 |

OTHER PUBLICATIONS

Ghormley, D. P. et al. "Slic: An Extensibility System for Commodity Operating Systems," Proceedings of the Usenix Annual Technical Conference, Jun. 15, 1998, pp. 39-52.

Moffett, J. et al, "Specifying Discretionary Access Control Policy for Distributed Systems," Computer Communications, NL, Elsevier Science Publishers BV, Amsterdam, vol. 13, No. 9, Nov. 1, 1990, pp. 571-580.

Flink, C W. et al., "System V/MLS Labeling and Mandatory Policy Alternatives," ATT&T Technical Journal, 67, May/Jun. 1988, No. 3, pp. 53-64.

"Performing Hierarchical Authorizations," IBM Technical Disclosure Bulletin, vol. 34, Issue No. 5, 1991, pp. 31-32.

"Mechanism for Trusted Computing Base Isolation," IBM Technical Disclosure Bulletin, vol. 34, Issue No. 8, 1992, pp. 214-215.

European Search Report in European Application No. EP 01400161, mailed Jul. 5, 2001.

European Search Report in European Application No. EP 01401170, mailed Jul. 5, 2001.

European Office Action in European Application No. 01400161, mailed Aug. 9, 2006.

European Office Action in European Application No. 01401170, mailed Jun. 8, 2006.

European Office Action in European Application No. 01401170, mailed Apr. 11, 2007.

European Office Action in European Application No. 01401170, mailed Oct. 30, 2008.

International Search Report in International Application No. PCT/IB/2006/003831, mailed Jul. 12, 2007.

Chinese Office Action in Chinese Application No. 02102067.1, mailed Dec. 10, 2004.

Chinese Office Action in Chinese Application No. 02102067.1, mailed Mar. 10, 2006.

* cited by examiner

| Untrused.exe: unsafe, virtualized program | Svchost.exe: non-virtualized, part of the OS |
|---|---|
| Create a new out-of-process COM object "{RegistryWriter}" 300 | |
| | Create a new COM server "{RegistryWriter}" (or return pointer to its already-running instance) 310 |
| Use the "{RegistryWriter}" component to write "Virus" into the registry. 320 | |
| | Performs the write operation on behalf of the virtual process (but on the real, non virtualized registry!) 330 |

*Figure 3* ing environment, they are transparent to the user so as to enable seamless operation of the computing system as if no virtualization is present. That is, while the user may launch programs, save and open files, etc., all in normal fashion, some of these actions are done in virtualized environments, unbeknownst to the user.

USER TRANSPARENT VIRTUALIZATION METHOD FOR PROTECTING COMPUTER PROGRAMS AND DATA FROM HOSTILE CODE

RELATED APPLICATION

This application claims priority from, and is a continuation of U.S. Provisional Application Ser. No. 61/260,784, filed Nov. 12, 2009.

BACKGROUND

1. Field

This disclosure relates to protection of computer data and programs, generally referred to as computer system and network security. The invention is useful for preventing data damage and theft, which can be done by malicious code attacks.

2. Related Art

The term virtualization has been used in the computing industry to mean different things. According to one use, the term means a software system that "mimics" or "virtualizes" a computer's hardware. Such a system was first popularized by VMware®, of Palo Alto, Calif., to enable one hardware computer to run multiple "guest" operating systems (OS) concurrently. Another use refers to virtualization of memory, sometimes referred to as storage virtualization. Storage virtualization is the process of completely abstracting logical storage from physical storage, such that storage addressing can be decoupled from the actual hardware available for storage. Yet another usage refers to a system such as Thinstall®, which enables easy portability and deployment of applications. A computer program is "packaged" or "encapsulated" such that it can be sent to a computer and can be executed without having to "install the program" in the traditional sense. The virtualized application is fooled at runtime into believing that it is directly interfacing with the original operating system and all of the resources managed by it, when in reality it is not. In this context, the term "virtualization" refers to the artifact being encapsulated (i.e., application), which is quite different to its meaning in hardware virtualization, where it refers to the artifact that is being abstracted (i.e., the physical hardware).

The current inventor has previously proposed another use for virtualization, which is for protection of computers against malicious or hostile code. We call "malicious" or "hostile" any code designed or modified to intentionally corrupt or steal data or programs from the computer system or network on which it runs. Protecting from hostile code is a challenging problem, since there is no way to programmatically distinguish positive and negative program actions, other than knowing whether they are ultimately good for the user or not. For example, a program may delete a file because the user has explicitly asked it to, but a malicious program could also delete a file against the user's will. In other words, there is no proper technical definition of "malicious" or "hostile" code—these being defined according to the behavior expected from a computer by its legitimate user.

Although it is possible to authenticate authorized users with password, trusted users themselves may endanger the system and network's security by unknowingly running programs that contain malicious instructions such as "viruses," "Trojan horses," "malicious macros," "malicious scripts," "worms," "spying programs" and "backdoors." A computer virus is a program that replicates by attaching itself to other programs. A Trojan horse is a program that, in a general way, does not do what the user expects it to do, but instead performs malicious actions such as data destruction and system corruption. Macros and scripts are programs written in high-level languages, which can be interpreted and executed by applications such as word processors, in order to automate frequent tasks. Because many macro and script languages require very little or no user interaction, malicious macros and scripts are often used to introduce viruses or Trojan horses into the system without user's approval. A worm is a program that, like a virus, spreads itself But unlike viruses, worms do not infect other host programs and instead send themselves to other users via networking means such as electronic mail. Spying programs are a subtype of Trojan horses, secretly installed on a victim computer in order to send out confidential data and passwords from that computer to the person who put them in. A backdoor is a secret functionality added to a program in order to allow its authors to crack or misuse it, or in a general way exploit the functionality for their own interest.

All of the above programs can compromise computer systems and a company's confidentiality by corrupting data, propagating from one file to another, or sending confidential data to unauthorized persons, in spite of the user's will. In spite of much effort by the industry to protect computers against such malicious codes, various vulnerabilities of the computers or users are exploited daily to introduce malicious codes into computers. Existing systems are programmed to identify a malicious code and either prevent that code from infecting the computer or remove it from the computer which has already been infected. However, in many cases the software either fails to identify a code as being malicious since information about the new code has yet to propagate through the system, or much damage has already been done by the time that the malicious code has been identified and removed. Therefore, the current inventor has previously proposed using certain implementation of virtualization in order to prevent the code from affecting the computer, before it has even been determined whether the code is malicious or not. Such a system is now marketed by the assignee under the trademark BufferZone™. More information about such a system can be found in U.S. Pat. No. 7,613,930.

The BufferZone system enables one to freely surf the web and download any program without having to worry about malicious code, since the Buffer Zone "virtualizes" the "surfing environment." This system is very effective since even if a malicious code was downloaded into the computer, it can only operate in the virtualized surfing environment and therefore cannot harm the computer or any files that are outside the virtualized environment. The subject invention provides further tools to improve this security system.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Various embodiments of the invention enable secure computing environment that prevent malicious code from "illegitimately" interacting with programs and data residing on the computing platform. While the various embodiments restrict certain programs to operate in a virtualized environment, such operation is transparent to the user from the operational point of view. Moreover, any program operating in the virtualized environment is made to believe that it has full access to all of the computing resources. To prevent a user from unknowingly or inadvertently allowing the program to adversely affect the computer, the user is also presented with "feel" that the program is able to perform all operations in the computing environment.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

DETAILED DESCRIPTION

Various embodiments of the invention are based on the recognition that adverse action of hostile programs are due to the fact that programs run with the same access privileges as the users who executed them. Thus, any object in the computer that is accessible to the user is also accessible to the programs the user runs—and may therefore be accessed by a hostile program in case the user inadvertently or intentionally runs such a program. To avoid this situation, a virtualized environment is created, wherein programs running in the virtualized environment have limited, if any, access to programs and data in the computer. Various objects in the computer are assigned to one of multiple trust groups, such that any object that is either unassigned or is assigned to an untrusted group is allowed to execute only in the virtualized environment. Any operation of a process over an object is then allowed or denied according to whether the process operates in the virtualized environment or not. In this manner, certain processes are allowed to freely operate, but only in the virtualized environment, which is isolated from the remaining resources of the computer. The virtualized environment is structured such that a program running inside the virtual environment believes that it has full access to all of the available computing resources, while in reality all of its actions are carried out only inside the virtualized environment and have no effect on objects and files outside of the virtual environment.

Unlike conventional security programs, by using the above "virtualized environment" method, there is no need to scan files or programs to detect known signatures and verify certificates. Rather, if a program is unknown or untrusted, it is allowed to fully execute in the virtualized environment. This provides the user with a full computing experience, while preventing malicious code from affecting any object residing in the computer. However, since a program running in the virtual environment has limited or no access to other objects in the computer, this may adversely affect the user's experience. Therefore, various features are implemented to make the virtualized environment transparent to the user.

For example, a program that is running in the virtualized environment is allowed to affect only the virtualized environment. Therefore, when such a program saves a file in a specified directory, according to features of the invention, the specified directory is duplicated into the virtualized environment and the file is saved to the directory in the virtualized environment. The specified directory is not changed, although the program believes it saved the file into the specified directory. Consequently, if the user will search for the file in the specified directory, the user will not be able to find the file, since it was actually saved in the copy of the directory, which resides in the virtualized environment.

To illustrate, assume for this embodiment that a virtual repository is created (i.e. C:\Virtual). Then, when a program running in the virtual environment attempts to create a file in a designated directory, this embodiment redirects the file to the virtual repository. However, if this is a legitimate program, the user may often need to see and use the file. But because the file was redirected to the virtualized directory, the user will be unable to find the file in the designated directory.

For example, in one embodiment, all Internet surfing is done exclusively via the virtualized embodiment. Consequently, if the user has downloaded a file and saved it on the desktop, while the user expects to find that file on his desktop, the file will actually be present only in the virtualized directory. That is, according to this embodiment, the downloaded file is redirected to a path such as, e.g., C:\Virtual\C_\Users\Name\Desktop, instead of the actual desktop (i.e. C:\Users\Name\Desktop). Therefore, when the user views the desktop, the file will not be visible on the desk top and, unless the user understands this operation, the user will be unable to find the file. This is rather inconvenient and does not present a transparent computing environment to the user.

Similarly, if the user has installed a program which creates links in the Start menu, if the program was installed from within the virtualized environment, embodiments of the invention redirect those new links to the virtual repository, i.e.: C:\Virtual\C_\Users\name\AppData\Roaming\Microsoft\Windows\Start Menu. Therefore these shortcuts will not be visible from the Windows' Start Menu (which looks for shortcuts within C:\Users\name\AppData\Roaming\Microsoft\Windows\Start Menu). This feature, while providing effective protection, fails to provide the user with a transparent computing environment.

In order to solve this usability problem, embodiments of the invention create what can be referred to as "virtual shortcuts". Whenever a file is created in the virtual repository, a shortcut file is created in the equivalent directory on the real (non-virtualized) file system, pointing to the virtual file. For example, if the virtualization engine redirects a file creation to C:\Virtual\C_\SomeDir\SomeFile.doc, then the virtual shortcut mechanism would create a shortcut in C:\SomeDir\SomeFile.doc (where the file was expected to be created if it wasn't virtualized) pointing to C:\Virtual\C_\SomeDir\SomeFile.doc. Consequently, when the user looks for the file or the shortcut in the designated "real" directory, the user will find the virtual shortcut. To the user it will appear like the real file or shortcut, so the user can easily find them where the user expects to find them. However, upon clicking on the virtual shortcut, the system is directed to the corresponding file in the virtual directory, thereby allowing the file to run only in the virtual environment.

Figure 1A:
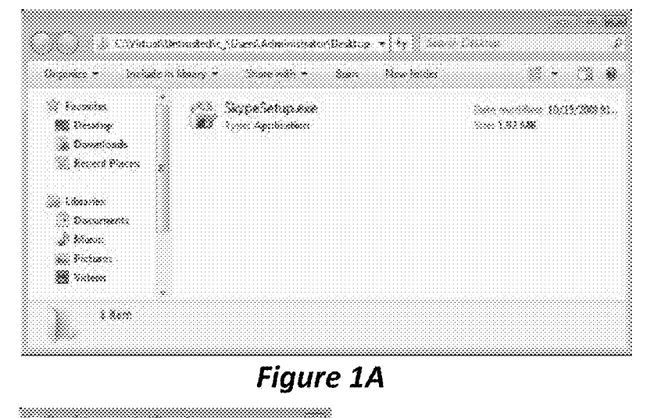
FIGS. 1A-1C illustrate an example of virtualized shortcut according to an embodiment of the invention.
Figure 1B:
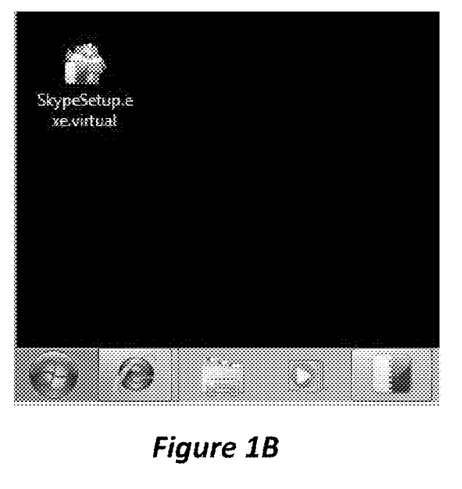
Figure 1C:
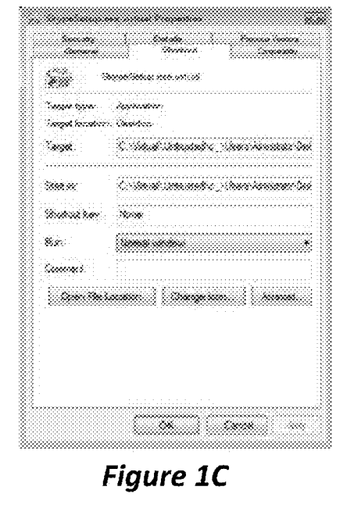

This process is illustrated in FIGS. 1A-1C. In FIG. 1A, a file named "SkypeSetup.exe" was created (downloaded) from within the virtual environment. Therefore, while the user intended to save the file on the desktop, the file is actually redirected to a corresponding virtualized directory, e.g., C:\Virtual\...\Desktop, by the virtualization mechanism of this embodiment. At the same time, an equivalent virtual shortcut named "SkypeSetup.exe.virtual.lnk" is created on the real, non-virtualized desktop, so that the user gets the impression that the file was indeed saved on the desktop. This is shown in FIG. 1B. However, to maintain security, the file was never stored on the desktop and never left the virtual environment. Instead, the virtual shortcut points to the actual file which was stored in the virtual directory, e.g., C:\Virtual\...\Desktop\SkypeSetup.exe file. So, when the user wishes to run SkypeSetup.exe, the user can click on the link on the real desktop, which will redirect the operation to the program SkypeSetup.exe which is stored in the virtual directory. Then, when the file SkypeSetup.exe is executed, it may only run inside the virtual environment, so that its installation will be only inside the virtual environment, thereby limiting its access to files within the real directories. According to one implementation, more advanced users are provided with the option to force the file to open outside the virtual environment. For example, right-clicking a virtual shortcut can bring a menu allowing the user to "open outside the virtual zone" or "move outside of the virtual zone," in case the user knows that the file is safe and wishes to run it outside the virtual zone.

This mechanism can be implemented either directly into the virtualization engine when it virtualizes a file, i.e., executes a create, rename, move, or delete operation, or in a separate module that monitors file creations inside the virtual repository (either by receiving notifications from the virtualization engine about file creation/renaming/moving/deleting, or by using other monitoring capabilities such as Windows' ReadDirectoryChangesW API.

One special case for this implementation is MSI (Microsoft Standard Installer) shortcuts. While regular Windows shortcuts simply point to a target file, startup directory, etc., MSI shortcuts don't point to any specific file but to an object class ID stored in registry. Since the present invention virtualizes registry changes, such object class ID doesn't mean anything outside the virtual environment. One possible way of solving this problem is by:
a. Creating the virtual shortcut outside the virtual environment, pointing to a specialized module, and providing it with the object class ID as a parameter. That module will then execute, resolve the object class ID from the virtual registry, and run the program from there.
b. While creating the virtual shortcut outside the virtual environment, automatically resolving it using the virtual registry, and making it point to the appropriate virtual file.

Additionally, some suffix or prefix can be added to the shortcut's name to indicate that this is a virtual shortcut (shortcut to a file created in the virtual repository), such as adding ".virtual" to the file's name (i.e. for a file named "SkypeSetup.exe", the virtual shortcut could be named "SkypeSetup.exe.virtual" or "SkypeSetup.virtual") so that the user knows that this shortcut points to a virtualized file creation.

Graphics notifications can be added or overlaid over virtual shortcuts (i.e. adding some visual indication into the virtual shortcut's icon, explicitly showing that this is a virtual shortcut as opposed to other types of shortcuts). In one example, a colored background or colored frame is added to the icon. This can be done either by implementing a shell extension's icon overlay, or by defining the shortcut's icon directly in the shortcut file.

Virtual shortcuts can be limited to just certain folders or certain file types. For example, it may be desirable to create virtual shortcuts only for files created beneath the user's data directories (i.e. C:\Users\...). Another example would be limiting virtual shortcuts only for certain file types such as: documents, executable files, etc.

To make the user's experience as transparent as possible, it is also preferable to track file operations performed on these virtual shortcuts. For example, if the user deletes the virtual shortcut "SkypeSetup.exe.virtual" from the desktop, chances are the user meant to delete the actual file as well (C:\Virtual\...\Desktop\SkypeSetup.exe), and therefore it is possible to implement monitoring of file operations (delete, copy, move, rename) on virtual shortcuts and duplicate them on the actual files pointed by these shortcuts.

Conversely, any operations performed on the actual files in the virtual repository need to be reflected on the virtual shortcuts as well. For example, if file C:\Virtual\...\Desktop\SkypeSetup.exe is renamed to NewSkype.exe or moved to C:\Virtual\C_, then the shortcut file C:\...\Desktop\SkypeSetup.exe.virtual.lnk needs to be renamed to NewSkype.exe.virtual.lnk or moved to C:\C_.

To summarize, when a file is created from within the virtual environment, the file is maintain inside the virtual environment by creating a virtual directory inside the virtual environment. Then, a corresponding "virtualized" link is created in the real directory. Thereafter, the actual files in the virtual repository and the virtualized link in the real directory are monitored for any changes. If a change is made to one, a corresponding change is made to the other. This provides a seamless operating environment for the user.

Once in a while, it may be desirable to undo the changes done by programs operating within the virtual environment. Indeed, some of these programs may be viruses, malware, unstable software, or simply software or toolbars that the user wants to get rid of. Since the virtualization mechanism redirects all modifications to a virtual repository (i.e. C:\Virtual), it is possible to clean the virtual environment by simply deleting the virtual repositories. By deleting the virtual repository on disk and in the registry, all persistent changes performed by virtual programs are undone, undoing all changes done within the virtual environment and returning the computer to its condition existing before the virtual directory was created.

Emptying or deleting the virtual repository as defined above cleans of all of the changes performed by virtualized programs. However, the user may have accumulated files and programs inside the virtual environment which the user wants to keep. For example, the user may have downloaded images from the Internet and wishes to keep them. For that purpose, it is possible to do a selective repository emptying based on, e.g., a white-list or black-list deletion. For example, deleting all files from the virtual repository except the "Bookmarks" directory, or except "*.doc" files. Inversely, it is possible to delete only certain repository elements, such as only the registry or only certain file types. It is preferred to close all virtualized processes before emptying the virtual repository. This repository emptying process can be automated or scheduled. For example, the virtual repository can be emptied every few days, or after each system reboot, or upon a certain event (i.e. virus detection inside the virtual environment).

When performing automated emptying of the virtual repository, it is possible to implement a mechanism of virtual snapshots, allowing to create virtual snapshots at certain times or intervals. Then, after the virtual repository has been empties, the virtual snapshots may be restored. This enables the user to keep accumulated files and programs inside the virtual environment, and only get rid of changes performed after a certain date.

According to one embodiment, creating such virtual snapshots is done by saving the files inside the virtual repository's directory (i.e. C:\Virtual), and exporting the registry values inside the virtual repository's key (e.g., HKEY_CURRENT_USER\Software\BufferZone\Virtual). The files and registry keys can be saved in a compressed form such as a ZIP file. The process may proceed as follows: 1. compress all virtual repository files (i.e. C:\Virtual) into virtual snapshot's ZIP file (i.e. C:\MySnahpshot.zip); 2. Export all virtual repository registry keys (i.e. HKEY_CURRENT_USER\Software\BufferZone\Virtual) into an export file (i.e. C:\Snapshot.reg); and 3. add the export file to the ZIP file.

Restoring virtual snapshots to a point in time can be done by overwriting the virtual repository with the contents previously saved in the virtual snapshot. According to one embodiment the process proceeds as follow (assuming the virtual snapshot was previously saved as a ZIP file): 1. Empty the virtual repository's contents (files and registry); 2. Extract the virtual snapshot's files into the virtual repository (i.e. C:\Virtual); and 3. Import the virtual snapshot's registry key into the virtual repository's registry (i.e. HKEY_CURRENT_USER\Software\BufferZone\Virtual).

It is preferred to close all virtualized processes before restoring the virtual repository.

The snapshots creation process can be automated. For example, it can be automatically performed once a day or before any new installation inside the virtual zone. Additionally, snapshots creation can be done on an incremental basis, rather than saving the entire repository every time, saving only new or modified virtual files and registry keys. Restoring or emptying of the virtual snapshots can be done automatically upon certain events, such as every few days, or when a virus is detected inside the virtual environment, or whenever the system is rebooted.

The decision of which programs will run in virtualized mode can be made using various rules. One example is using a white-list, a black-list, or a combination of the two. According to one embodiment that uses black-listing, a predefined list of programs is generated. Whenever one of these programs is executed, the system flags the executing process to be allowed to run only in the virtualized environment. For example, let's assume that the black-list is composed of programs that are most likely to cause vulnerability to the computing system, such as popular web browsers, messenger programs (e.g., AOL Messenger), etc. Such a list may include iexplore.exe, chrome.exe, firefox.exe, avant.exe, opera.exe, Skype.exe, etc. Whenever a new process is loaded (executed), it is checked to see if that process is listed on that black-list. If that is the case, the program is flagged as being allowed to execute only in virtualized mode. Such black-list can also include other functionalities that may introduce vulnerabilities, such as paths (e.g., c:\public), shares (i.e. \\server\public), file types (i.e. *.msi), or origin (i.e. removable media, USB thumb-drives, CD-ROM, etc.). For example, a rule can be created that every file originated from a USB device is black listed.

According to one embodiment, the black list can be managed dynamically. That is, in this embodiment the system performs tracking of all file creations of executables, script files, documents with macros, or any other risky file types. The system may then add these to a list of "recently-created programs" and allow these to execute only in virtualized mode, at least until it has been determined that they are safe. This mechanism can apply to all, or certain programs only. For example, email clients may run un-virtualized, while files they create are marked to run virtualized, if their file type is risky.

According to another embodiment, white-listing is implemented. That is, by defining which programs are trusted (for example, during installation of a system according to the present invention), it is easy to decide that all other programs which were not flagged as trusted will run in virtualized mode.

Both of the above methods can be implemented separately or combined together. Decision of what programs are/aren't on each of these lists can be done by any variety of well-known mechanisms such as name comparison, file hash checking, database etc.

Exceptions can be made to any of the above modes, to let programs run without virtualization. Such exceptions can rely on digital signatures, program origin, or any proprietary method of setting executable file's trust. For example, it is possible to decide that any digitally-signed executable file should be allowed to run without virtualization (or to prompt the user and let the user decide). Microsoft has standardized a mechanism for signing executable files called AuthentiCode. This mechanism of digitally signing executable code can be leveraged for deciding that a program is trusted. It is also possible to define that only executables signed by a specific software publisher should be allowed. Proprietary methods of trusted executables can easily be a substitute to the AuthentiCode mechanism (for example: proprietary way of signing executables, or an updated list of safe programs). It is also possible to define that programs arriving from removable media should be or should not be included by such exceptions.

According to an embodiment of the invention, it is possible to define that any programs originating from a removable media, such as USB thumb-drives, be automatically run in virtualized mode. It is further possible to define that only the "autorun" part of removable media should run in virtualized mode ("autorun" is the mechanism that causes files to open automatically when removable media is inserted, and which is often targeted by viruses and Trojan horses). It is possible to add more granularity and apply this protection only to (or only not to) certain types, serial volumes, or brands of removable media. Of course, this protection mechanism can be combined with the above method of providing exceptions.

As explained above, according to embodiments of the invention, programs that run in the virtualized environment have no or limited access to files outside the virtual environment. For example, programs running in the virtual environment may read files from the real system, but may not write, delete or modify files on the real system. When such a program attempts to modify or delete a file in the real system, a copy is created in the virtual environment and only the copy is modified or deleted, making the program "think" that the modification or deletion operation was performed. However, one obvious disadvantage of such a virtualization system is that it lets untrusted software see and read files which may be considered private and confidential. Malicious programs can therefore read and send out confidential files to an attacker, even though they cannot harm or damage the system.

Therefore, according to an embodiment of the invention, the system enables defining a list of confidential objects, such as confidential files, folders, registry keys or registry values. Then, when programs running inside the virtualized environment attempt to read these confidential folders or objects, they will be denied access. Furthermore, when these programs list (enumerate) files or objects in these paths, they will not see any of the real files there.

For example, if the "My Documents" folder is defined as confidential, then when programs executing in the virtualized environment request listing of the contents of that directory, they will initially see zero files. Additionally, if they happen to try and open a file abc.txt directly (even though it isn't listed), they will either obtain "access denied" or "file not found" or "path not found" error. Hiding files from a listing request (i.e. FindFirstFile/FindNextFile APIs in the Windows OS) can be done by intercepting APIs and system calls at the user-mode or kernel-mode levels (such as NtQueryDirectoryFile) and removing entries before they are returned to the requesting program.

However, it may happen that the user wishes to save a file downloaded from the Internet in a folder that is designated confidential. For example, the user may wish to save an attachment text.doc into the My Documents file, which is designated as confidential. Under such circumstance, since the virtualized program cannot see the My Documents folder, the user will be unable to select that folder for storing the document. Therefore, according to an embodiment of the invention, virtualized programs are allowed to see the confidential folders, but not their contents (files). Consequently, the program can now see the folder and the user may select the folder for saving a file therein. However, if the virtualized program attempts to create new files inside such a folder, it is in fact redirected to the virtual repository and stored under a corresponding folder in the virtual directory. Thereafter, the program is allowed to see these files as if they are inside the confidential folder, but which are in fact inside the C:\Virtual\... folder. The programs can never see the actual files that are actually inside the real confidential folder.

For example, let's assume C:\My Documents is defined as a confidential folder, and contains ten document files. When a virtualized program requests to enumerate the files in C:\My Documents, it will obtain "no files". If the virtualized program then requests to create a file called "newfile.doc" inside C:\My Documents, according to this embodiment the file will be redirected and created in C:\Virtual\C_\My Documents\newfile.doc, and then success will be returned. Thereafter, if a virtualized program again requests to enumerate the files in C:\My Documents, it will obtain one single file: "newfile.doc". In other words, the "merging" of two directories listings is cancelled for confidential folders, so that virtualized programs can only see files in the virtual repository for these folders.

Figure 2:
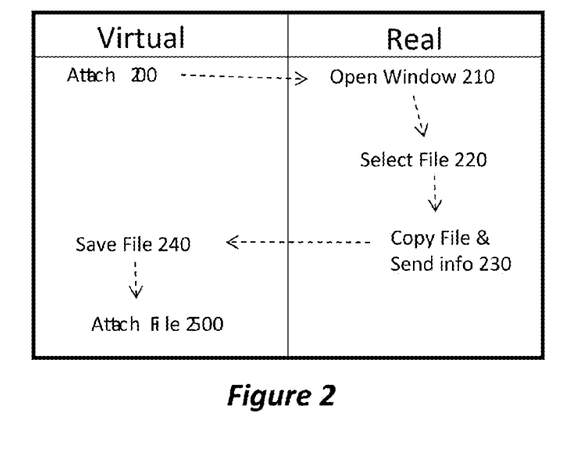
FIG. 2 illustrates an embodiment enabling a user to securely attach a file residing outside the virtualized environment onto a program running inside the virtualized environment.

However, this again may create a confusing computing environment to the user. For example, assume a user uses a browser to access an email account. The browser will be executing inside a virtualized environment. Now assume that the user attempts to attach a document from "My Documents" folder to an email. Since the My Document folder is defined as confidential, the folder will appear empty to the user when attempting to attach a document using the browser. Therefore, in order to let such virtualized programs keep maximum functionality and transparency to the user, according to an embodiment illustrated in FIG. 2, the following process ensues. In step 200, when the user operating inside the virtual environment attempts to attach a file from within a confidential folder, a window is opened in the real environment, i.e., outside the virtualized environment, as shown in step 210. Since this window opens outside of the virtual environment, it cannot be compromised or interacted with from programs within the virtual environment. In step 220 the user is then allowed to select any document from within the window, since the window has access to all files in the system. Once the user selects a file, in step 230 the file is copied and the result of the user's selection is sent to the browser. Then, in step 240 the file is stored in a corresponding folder in the virtual directory. The copied file is then visible to the browser and in step 250 it can be attached to the email. Optionally, after passage of a predetermine time period, the file is erased from the virtual directory.

As explained so far, embodiments of the present invention confine viruses and malware inside a virtualized zone where it can do no harm to the system, by using files and registry virtualization. However, some malicious programs are programmed to steal information, and do not intend to actually infect nor corrupt anything on the system as their primary aim. Such programs can wait for the user to enter an e-bank website, or to put in their credit card information on a website. They then read the information the user sends, stealing personal credit card and password information. While the embodiments described above are good at isolating virtualized programs, files, and sessions, from non-virtualized ones, they do not provide strong protection among virtualized programs themselves. Therefore if, for example, a web browser executes in the same virtualized session and repository as the malware that was inadvertently downloaded (which is likely to happen), the system remain vulnerable to such acts of theft.

To avoid such problem, another embodiment uses the new concept of "Safe URLs". According to this embodiment, a list of URL names and/or types is built to include known safe URL's. For example, the list may include: "bankofamerica.com," "*.ebay.com," "https://*" (i.e., Hypertext Transfer Protocol Secure (HTTPS), which is a combination of the Hypertext Transfer Protocol with the Secure Socket Layer (SSL/TLS) protocol to provide encrypted communication and secure identification of a network web server) or any https website with a valid certificate. A module then monitors the user's web browsing and, whenever a URL is changed, it checks the destination URL against the list of safe URLs. If it matches, the browser leaves the current virtualized session and enters either a different virtual environment (by using a different virtual file and registry repository) or leaves the virtualized environment completely, and enters the real system (which is considered safe, since it is isolated from untrusted programs as explained above).

Leaving a virtualized environment or moving to a different one can be done in different ways, such as launching a completely new browser process in the new virtual environment (or the real environment) or re-defining the browser's virtual trust group in memory. Launching a completely new browser process in the new virtual environment is safer, since today's browsers may be running several tabs, pointing to different websites all in one same browser session. Also, a browser may carry plugins, toolbars, DLLs, and it is not safe to transport them from one virtual trust group to another.

It is furthermore possible to mark the new browser's session with some graphical indication (i.e. colored border, locker icon, etc.) to show users that they are surfing a safe website. This is also good indication that the website they are surfing to is the actual safe website, and not a "phishing" website (such as "bank-of-america.com", if the user is used to surfing to "bankofamerica.com").

Once in the safe website session, if the user goes to a URL outside of the safe URLs list, they should be automatically returned to the original virtualized environment. Monitoring URL changes can be done by, e.g., using browser helper objects, browser plugins, or by watching the browser's network traffic at a lower level. If the URL list contains a rule to include "secure http sites with a valid certificate", then the website's certificate must be checked for validity before the target URL is considered safe.

This feature is also important as defense against keylogging. Keystroke logging (often called keylogging) is the action of tracking (or logging) the keys struck on a keyboard, typically in a covert manner so that the person using the keyboard is unaware that their actions are being monitored. Keylogging can be used to steal passwords, personal information, and other confidential data. To avoid this vulnerability, some commercial programs "hide" all keystrokes from all programs. However, this creates another problem, as some programs cannot operate when the keystrokes are hidden. For example, on-line translators, such as Babilon.com, must see the keystrokes in order to provide the translation. Similarly, when using keyboard shortcuts, e.g., "Ctrl S" to save a document, the keystrokes cannot be hidden. Such programs cannot operate when the key strokes are hidden. However, commercial programs that hide keystrokes cannot distinguish which program is a good and which is bad—it simply hides the keystrokes from all programs.

Conversely, according to embodiment of the invention, a first level of distinction was already created, i.e., programs running within the virtual environment and programs running outside the virtual environment. Therefore, to prevent keylogging, in one embodiment programs that run inside the virtual environment cannot see keystrokes made for the benefit of any other program, whether running inside or outside the virtual environment. This can be done by denying virtualized programs access to keyboard-listening functions such as SetWindowsHookEx, GetKeyboardState, GetKeyState, etc. Again, this solution is often too restrictive, as many legitimate programs require the use of these APIs.

According to a second embodiment, any program running inside the virtual environment is prevented from seeing any keystrokes entered for a benefit of a program running outside the virtual environment. For example, when the user types a document in MSWord®, none of the programs running inside the virtual environment, e.g., a web browser, can see the keystrokes. This feature operates well when also implementing the above "safe URL" feature, as when the browser points to a safe URL, such as bankofamerica.com, it will be outside the virtual environment, such that all keystrokes are made outside of the virtual environment and are hidden from any potential malicious code running inside the virtual zone.

Keylogging can also be controlled by denying access to keyboard-listening functions while the foreground focused window belongs to a process of a different trust group. For example, if the foreground window belongs to Microsoft Word (non virtualized), and Internet Explorer (virtualized) tries to call keyboard-listening functions, then it should be denied. On the other hand, if the foreground window belongs to a process of the same trust group, then it should be allowed. Also, non-virtualized programs should not be allowed loading DLLs (Dynamic Loadable Libraries) from the virtual repository. This protects against global hooking mechanisms such as the SetWindowsHookEx API, where a single program can inject a DLL to all running processes. A further protection can be provided by having non-virtualized programs go through a keyboard encryption mechanism, where a low-level driver encrypts keystrokes, which are decrypted in user-mode only for non-virtualized programs.

According to yet another embodiment of the invention, the above idea is taken further by disallowing inter-process communication. Inter-process communication (IPC) is the name given to any mechanism that allows one process to communicate with another one. A typical example of IPC is when Microsoft Word is running, after double-clicking a *.DOC document, Windows Explorer will tell the existing Microsoft Word to open that specified *.DOC document, without having to launch another Word session. Such an access needs to be protected to prevent virtualized processes from communicating or influencing non-virtualized processes. This protection can be provided by following any of the following method of the present invention, which can be combined.

One method is of controlling Window messaging APIs such as SendMessage, PostMessage, PostThreadMessage, EndTask (and their different variations). When those APIs are called by virtualized programs, the system checks whether the target thread or window belongs to a virtualized program of the same trust group. If that's the case, the message is allowed to go out. Otherwise, it is blocked. A variation of the above method is to control this on the receiving end (not the sending end). Whenever a message is received by a process, checking if it came from a virtualized process of the same group or not. If not, dismissing the message and not passing it to the thread or window. This method is more complex to implement (requires knowing which process initiated each message), but it is more tamper-proof because the checks are not performed within the context of the potentially-corrupted process. Either method should allow for exception processes to be allowed communication from virtualized processes, such as the Windows Explorer.

Another, complementary method of blocking inter-process interaction, works as follows. When a virtualized process requests to obtain a handle onto another process (i.e. using the OpenProcess or OpenThread APIs), the system checks if the requested access mode is dangerous or not (i.e. is the access mask just for general-purpose reading, or is it also for terminating the process, modifying it or injecting code into it). If it is dangerous, then the system checks if the target process is in the same virtualized trust group. For example, if a virtualized process tries to obtain a handle for terminating a non-virtualized process, that operation will be denied. If, on the other hand, it tries to obtain a handle for terminating a virtualized process from the same group, it is allowed.

According to embodiments of the invention, virtualization and trust groups are inherited from a process to its child processes. For example, if process "iexplore.exe" (Internet Explorer) runs in virtualized mode as untrusted, and it downloads a program "download.exe" which the user then chooses to execute, then "download.exe" will also execute in virtualized mode as untrusted. However, at times it is desirable to break the inheritance chain for programs which are certain to be safe, especially if these programs are digitally-signed installers or updates. The user will usually want them installed outside the virtual zone, on the real system.

A solution to this can be to check the program's trust (i.e. by checking for a digital signature such as AuthentiCode signature), and if it is valid, let that program execute (with or without asking the user) outside the virtual zone. Additional conditions may be added, such as checking if that program seems to be an installer or an update. This check can be done either when the file is being executed, or when the file was downloaded into the virtual repository in the first place. For example, files without risk (e.g., text files, image files, documents without unsigned macros, PDF files, etc.) can be defined to be saved outside the virtual zone. Defining safe files can be done by, for example, defining safe file types by names (i.e. *.txt, *.jpg, *.pdf) or inversely unsafe file types (i.e. *.exe, *.ocx, *.dll) or by defining safe/unsafe file types by header (i.e. image file header, executable file header, document file header). For example, by looking at a certain number of bits at the beginning of the file and determining its type from those bits. Saving these files outside the virtual zone can be done in the following ways: a. Whenever virtualized programs create a new file of a safe type, redirecting that file outside of the virtual repository (and if the file's type/extension later changes, putting it back inside the virtual repository), or b. waiting for the file's creation writing to finish, and then (during the file close operation) move the file outside of the virtual zone, if it's deemed safe, or c. for executable files, letting the file be created and stored in the virtual zone, but upon execution letting it execute un-virtualized (even though the .exe itself is stored in the virtual repository).

The same needs to happen for file modifications. Taking a concrete scenario: iexplore.exe (Internet Explorer) saves a safe PDF file on the desktop. It therefore creates the PDF file, which gets redirected into the virtual zone: C:\Virtual\C_\Desktop. It writes the file's contents and, when it closes the file we need to check if the file is safe (i.e. is a known file type that does not contain executable code, or inversely is not a known dangerous file type). If it is safe, we let the file's closing happen and before we return control to the calling program, we move that file to the real C:\Desktop. Next, iexplore.exe again downloads a new version of that PDF file (same name, to the same location, with the same name). We perform the same operation, overwriting the previously written file. This leaves an open door for untrusted virtualized programs to overwrite non-virtual, trusted files, which is not acceptable. To solve this issue, only new files should be allowed this operation. Files which already existed outside the virtual zone (created by non-virtualized programs) should never be overwritten by such operation. It is easy to mark files that were created by virtualized programs, even if they are saved outside the virtual repository. Such attribute can be marked in a list, database, or in the files' meta data. Additionally, precaution measures and limitations can be combined, such as limiting this sort of operation only to certain folders.

Sometimes it may be useful to let virtualized programs to write directly to some parts of the hard disk without going through redirection. For example, users may want pier-to-pier (P2P) programs (which download very large files) to run in virtualized mode, yet still create the large download files directly in the real download directories. It is possible to define a list of directories for which virtualization (directory redirection) does not apply. Because of the unsafe nature of the virtual zone, it is preferred to also mark these directories as unsafe, and automatically run any file opened or executed from there to run in virtualized mode.

Embodiments of the invention also enable secure handling of COM (or DCOM) and RPC features (Component Object Model, Distributed Component Object Model, and Remote Procedure Call). These features relate to a common practice in programming of using small program building blocks (or applets) to facilitate performing various general functions. For example, in Microsoft environment it is conventional to use ActiveX control, which is part of Microsoft's COM technology. To illustrate, assuming an application requires the use of the user's address book. Rather than including a complete address book program in the application, the application can simply request an address book service from the OS, e.g., via ActiveX control. Various web browsers also allow embedding ActiveX control onto web pages. While this feature is very useful to achieve functionality efficiently, it also introduces vulnerability and various malicious programs may attempt to take advantage of this feature, i.e., utilizing these available services to harm or steal data from the computer. This feature also introduces a specific concern in terms of the subject invention. That is, a program running in the virtualized environment may request such services from the OS to perform malicious operations outside of the virtual environment. So, while the malicious code executes inside the virtual environment and itself cannot reach resources outside of the virtual environment, it may use features such as out-of-process COM control as a window to reaching resources beyond the virtual environment.

Additionally, use of features such as out-of-process COM can override the inheritance control of the virtualized environment. That is, according to embodiments of the present invention, trust groups and virtualization are inherited from a process to its children. For example, if a process that is allowed to run only in the virtual environment generates a child process, the child process will inherit the same trust level and will also be allowed to run only in the virtual environment. However, out-of-process COM results in a new process executed by some system components (i.e. svchost.exe in the Windows OS), or even using an existing COM server which runs outside of the virtualized environment. This can result in a virtualized program causing a non-virtualized COM server to run, and/or communicating with it. This is both a security problem and a functionality problem (the non-virtualized server not working with the same files and registry view as the virtualized client).

Figure 3:
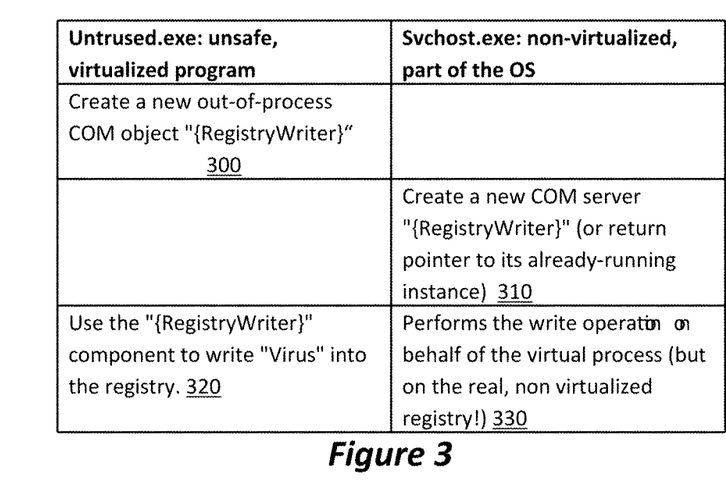
FIG. 3 illustrates an example of a virtualized program achieving security breach using a COM service.

An example of a virtualized program achieving security breach using a COM service is shown in FIG. 3. In step 300 a malicious program operating inside the virtualized environment requests the system for a "RegistryWriter" component. In step 310 the system initializes this component unvirtualized, i.e., outside the virtualized environment, therefore with full access to the system. In step 320 the virtualized program directs the RegistryWrite component to write a virus into the registry. Since the RegistryWrite has access to all system privileges, in step 330 it performs the request and writes the virus into the system registry, thereby achieving a security breach.

Embodiments of the invention solve this issue by tracking COM/RPC requests for services and, if the request originated from a program running within the virtualized zone, forcing the service process originating from the request to also execute within the virtualized environment. However, tracking such requests is not that straight forward. The problem is that various programs can communicate with the service agent, e.g., Windows component, at the same time, and the meaning and origin of each request may not be decipherable to the security virtualization program.

Therefore, according to one embodiment, the system is made to run an additional instance of the system's COM/RPC servers, virtualized, to serve requests from virtualized programs, on a dedicated pipe. In Windows, when an application needs a COM/RPC service, it sends the request via a communication pipe, e.g., DCOM pipe, and all applications use the same communication pipe (or "local ports," which are a similar concept). Therefore, according to this embodiment, when a program within the virtual zone attempts to open the communication pipe, the security virtualization program makes it open a different pipe instead. So, for example, on Windows, any request by a virtualized program from the "untrusted" zone to open the pipe "ntsvcs" would result in opening the pipe "ntsvcs_untrusted". This request hence reaches the dedicated virtualized COM/RPC server and hence any I/O or process execution happens inside the virtual zone's context and boundaries.

To implement this mechanism, the security system initiates virtualized instances of RPCSS.EXE and DComLaunch.exe (the Windows COM/RPC servers) either during startup or upon first COM/RPC request, and make them wait for requests on a modified pipe name. Similarly, virtualized programs also have their pipe names changed (by hooking the APIs for accessing those pipes, such as NtSecureConnectPort etc). Thus, the virtualized COM/RPC server and clients communicate together. And since the server runs virtualized, its request processing is done in virtualized too.

According to another embodiment, a method is implemented to intercept and analyze all COM/RPC requests coming to the original RPCSS.EXE and DComLaunch.exe Windows servers, and handle differently those that came from virtual processes. In order to accomplish that, two main challenges need to be solved: a. need to identify COM/RPC requests coming from virtualized processes (as opposed to those coming from regular, non virtualized processes) and b. need to virtualize the I/O operations performed by the COM/RPC server resulting from this request. Identifying the requests can be done either by using functions such as "GetNamedPipeClientProcessId" and comparing the client process ID to the list of virtualized process IDs, or by implementing a Windows user token into the virtualized process. Windows then takes care of transferring that token along with any message/pipe data sent to RPC/COM servers. Virtualizing the I/O operations can be done by tracking the specific thread that serves the request on RPCS.EXE/DComLaunch.exe side. By tracking the thread that received the message and the threads or processes that are created from it, it is possible to track which I/O requests belong to that COM/RPC request.

The same general idea can also be implemented for general OS services. Windows Services have an important role in the system, and therefore virtualized processes should not be allowed to start, stop, delete, or modify them. Additionally, Services start very early in the operating system's startup order, and thus we must take steps to make sure they do not start before the protection system. The following are examples for ways to secure OS Services from virtualized processes on the Windows operating system.

The most restrictive method is to deny requests coming from virtualized processes for stopping, starting, deleting, or modifying existing Windows services. On the other hand, the system still authorize virtual processes to create and manipulate their own (self-created) services. This is done as follows. Whenever a virtual process asks to create a Service, that service is allowed to be created after making two changes to that request: a. flagging the new Service as a virtual service. This can be done by simply adding a suffix to the service name (ie_Untrusted); and b. defining the new Service as being dependent on the virtualization security's own Service. This lets Windows ensure that the new Service will never start before the virtualization security Service and will never continue to work after virtualization security Service has stopped.

The more flexible solution is similar to the solution above, but instead of denying Service to start or modify requests, it creates a duplicate Untrusted Service as described above, and lets the start or modify request occur on that Untrusted service.

So far embodiments of the invention were described with respect to a single virtualized environment. However, all of the above embodiments can be implemented in a system running multiple virtualized environments, wherein each process is assigned to only one of the virtualized environments. In such a case, it is also possible to define that a program running in one virtualized environment cannot interact with a program running outside its virtualized environment, including those running in different virtualized environments.

For example, Internet Web browsers could belong to the "Untrusted" group (C:\Virtual\Untrusted, registry key HKLM\Virtual\Untrusted), while email would belong to the "Mail" group (C:\Virtual\Mail, registry key HKLM\Virtual\Mail), and games to the "Games" group (C:\Virtual\Games, registry key HKLM\Virtual\Games). This allows for a cleaner separation between virtualized applications, and allows easier recovery from virus infection in either of the virtual repositories, because each virtual repository can be emptied separately and does not affect the others. Moreover, it is possible to establish a mechanism where every new virtualized program installation could take place in its own, separate virtual trust group. For example, when installing a new program "NewProgram.exe", the installation could be automatically moved to a new virtual repository named "NewProgram", hence separating that new program from the rest of the virtual repositories.

After some time, a program running in virtualized mode may be deemed safe by the user or any automated mechanism. In this case, it is possible to merge it back into the real system, so that the user can integrate it into their real machine without having to re-install the program a second time outside the virtual zone.

The mechanism for merging is as follows:

The timestamp of every file/registry value in the virtual zone is compared to the equivalent file/registry value on the real system.

If the virtual element's timestamp is newer than the real system's element (or if it does not exist on the real system at all), then the virtual element is copied to the real system.

If the virtual element's timestamp is older than the real element's, then that value is not merged, or merging is aborted altogether.

If the virtual element's timestamp is newer than the real's element, but the real's element has changed since the virtual program was started, then the element should not be merged, or merging should be aborted altogether.

One should note that the virtual repository in itself contains enough information to generate activity logs of the behavior of the programs executed in it, since the virtual repository is made of the changes and modifications performed by the programs running in it. Hence, to generate an activity log about a program running in the virtual zone, it is enough to collect the files and registry values in the virtual zone and transform them into a readable log. This gives an accurate representation of everything the virtualized program tried to modify on the system.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc. Moreover, other implementations of the invention will be apparent to those skilled in the art from consideration of the specification and practice of the invention disclosed herein. Various aspects and/or components of the described embodiments may be used singly or in any combination in the plasma chamber arts. It is intended that the specification and examples be considered as exemplary only, with a true scope and spirit of the invention being indicated by the following claims.

The invention claimed is:

1. A computer implemented method for maintaining security of a computing system having a real file directory, comprising directing a processor to perform the actions:
   defining a virtualized environment within the computing system wherein programs running in the virtual environment are restricted programs that have limited or no access to trusted programs and data residing in the real file directory;
   defining a virtualized repository within storage resources of the computing system, the virtualized repository comprising a virtualized file directory;
   whenever a program runs within the virtualized environment, preventing the program from modifying with any computing resources that are residing in the real file directory;
   whenever a program executing within the virtualized environment attempts to save a file in a designated folder from the real file directory, performing the following operations:
      if no virtualized folder corresponding to the designated folder exists within the virtualized repository, creating a corresponding virtualized folder inside the virtualized repository, saving the file inside the virtualized folder, and creating a virtual shortcut inside the designated folder in the real file directory, the virtual shortcut pointing to the file inside the virtualized folder; and,
      if a virtualized folder corresponding to the designated folder exists within the virtualized repository, saving the file inside the virtualized folder, and creating a virtual shortcut inside the designated folder in the real file directory, the virtual shortcut pointing to the file inside the virtualized folder;
      whereby the program executing within the virtualized environment can find the file in the virtualized directory and a user can find the file in the real file directory; and,
      further comprising adding a graphical indicia to the virtual shortcut inside the designated folder to indicate that the virtual shortcut points to the file inside the virtual environment.

2. The computer implemented method of claim 1, wherein when a user clicks on the virtual shortcut, the system allows the file to execute only within the virtualized environment.

3. The computer implemented method of claim 1, further comprising enabling the user to select whether the file should execute only inside the virtualized environment or be allowed to execute outside the virtual environment.

4. The computer implemented method of claim 1, further comprising adding suffix or prefix to the name of the virtual shortcut inside the designated folder.

5. The computer implemented method of claim 1, further comprising:
   generating a list of file types;
   whenever a program executing within the virtualized environment attempts to save a file in a designated folder, first determining whether the designated file corresponds to a file type listed in the list of file types and, based on this determination deciding whether to proceed with storing the file inside the designated folder or inside the virtualized folder.

6. The computer implemented method of claim 1, further comprising:
   designating a directory level among plurality of directory levels of the real directory;
   whenever a program executing within the virtualized environment attempts to save a file in a designated folder, first determining whether the designated file reside below or above the designated directory level and, based on this determination deciding whether to proceed with storing the file inside the designated folder or inside the virtualized folder.

7. The computer implemented method of claim 1, further comprising tracking operations performed on the virtual shortcut and performing corresponding operations on the file.

8. The computer implemented method of claim 1, further comprising:
   defining a list of harmless file types;
   defining a point of deletion event; and,
   whenever the point of deletion event is reached, deleting all files in the virtualized repository, except file corresponding to the list of harmless file types.

9. The computer implemented method of claim 8, further comprising:
   defining a restore point;
   taking a snapshot of the virtualized repository;
   whenever the point of deletion event is reached, after deleting all files in the virtualized repository, restoring the snapshot into the virtualized repository.

10. The computer implemented method of claim 1, further comprising:
    defining a list of restricted programs;
    whenever a program attempts to execute determining whether the program is listed on the list of restricted program and, if so, restricting the program to execute only within the virtual environment.

11. The computer implemented method of claim 1, further comprising:
    defining a list of trusted programs;
    whenever a program attempts to execute determining whether the program is listed on the list of trusted program and, if not, restricting the program to execute only within the virtual environment.

12. The computer implemented method of claim 1, further comprising:
    defining a list of safe URLs;
    whenever a browser executes, monitoring the URL the browser is pointing to and whenever the URL is listed on the list of secure URLs allowing the browser to execute outside the virtualized environment and, otherwise, limiting the browser to execute only inside the virtualized environment.

13. The computer implemented method of claim 1, further comprising:
    Whenever a program initiates, determining the origin of the program and, if the origin is a removable media, restricting the program to run only inside the virtualized environment.

14. The computer implemented method of claim 1, further comprising:
    defining a list of confidential objects;
    preventing any program running inside the virtualized environment from seeing content of any object listed in the list of confidential objects.

15. The computer implemented method of claim 14, further comprising:
whenever a program executing inside the virtualized environment attempts to access an object listed in the list of confidential objects, performing:
opening a user window outside the virtualized environment;
enabling a user to select the object from within the window;
upon object selection, copying the object into the virtual environment to thereby create a virtualized object;
providing the program an access to the virtualized object.

16. The computer implemented method of claim 1, further comprising:
whenever a new program initiates, checking whether the new program contains a valid digital certificate and, if so, allowing the new program to initiate outside the virtual environment; otherwise, limiting the new program to the virtualized environment only.

17. The computer implemented method of claim 1, further comprising:
monitoring all out-of-process requests directed to the operating system;
for each out-of-process request, checking whether the request originated from inside the virtualized environment and, if so, allowing the out-of-process request to execute only inside the virtualized environment.

18. The computer implemented method of claim 17, further comprising:
generating virtualized instances of out-of-process request ports and directing all out-of-process requests originating from a program executing inside the virtual environment to the virtualized instances of out-of-process request ports.

19. The computer implemented method of claim 1, further comprising:
Preventing a program executing inside the virtualized environment from seeing keystrokes made for the benefit of another program.

\* \* \* \* \*